(12) United States Patent
Wu (10) Patent No.: US 7,957,719 B2
(45) Date of Patent: Jun. 7, 2011

(54) METHOD FOR REDUCING LOAD OF TRAFFIC PLANE FUNCTION

(75) Inventor: Yajuan Wu, Shenzhen (CN)

(73) Assignee: Huawei Technologies, Co. Ltd., Shenzhen (CN)

( * ) Notice: Subject to any disclaimer, the term of this patent is extended or adjusted under 35 U.S.C. 154(b) by 1320 days.

(21) Appl. No.: 11/497,687

(22) Filed: Aug. 2, 2006

(65) Prior Publication Data

US 2007/0123213 A1 May 31, 2007

Related U.S. Application Data

(63) Continuation of application No. PCT/CN2005/001230, filed on Aug. 10, 2005.

(30) Foreign Application Priority Data

Aug. 10, 2004 (CN) .......................... 2004 1 0070067

(51) Int. Cl.
*H04M 11/00* (2006.01)
(52) U.S. Cl. ..................................... 455/406; 455/422.1
(58) Field of Classification Search .................. 455/406, 455/422.1
See application file for complete search history.

(56) References Cited

U.S. PATENT DOCUMENTS

2004/0203710 A1* 10/2004 Gabor et al. ................ 455/422.1

FOREIGN PATENT DOCUMENTS

| CN | 1395391 A | 2/2003 |
|---|---|---|
| CN | 1507200 A | 6/2004 |
| CN | 100474810 C | 4/2009 |
| WO | WO-0241592 | 5/2002 |
| WO | WO-03047164 | 6/2003 |
| WO | WO-03081843 | 10/2003 |
| WO | WO-2004/036890 | 4/2004 |

OTHER PUBLICATIONS

International Search Report for PCT/CN2005/001230, mailed Nov. 24, 2005.

(Continued)

*Primary Examiner* — Charles Shedrick
(74) *Attorney, Agent, or Firm* — Finnegan, Henderson, Farabow, Garrett & Dunner LLP (57) ABSTRACT

Disclosed is a method for reducing the load of Traffic Plane Function (TPF). According to the obtained indication on whether to perform charging, the TPF determines whether to perform charging operation for the service data flow using appropriate charging rules, if yes, the TPF performs the charging operation for the counting result of the service data flow and submits the charging information to the charging associated entities; otherwise, the TPF does not perform the charging operation for the counting result of the service data flow. Operation in the TPF is optimized such that the TPF only needs to perform necessary charging instead of performing charging operation for the service data flow not needing to be charged. As a result, the load of the TPF and network devices are reduced, system efficiency is improved, and waste of network resources from various operator charging policies, e.g., free of charge policy, is avoided.

20 Claims, 6 Drawing Sheets

OTHER PUBLICATIONS

3GPP, "3$^{rd}$ Generation Partnership Project; Technical Specification Group Services and System Aspects; Overall High Level Functionality and Architecture Impacts of Flow Based Charging; Stage 2 (Release 6)," 3GPP TS 23.125 v6.0.0 (2004).

European Search Report for Application No. 05772878.Apr. 1244, dated Sep. 25, 2007.

English Translation of the Written Opinion of the International Searching Authority in PCT Application No. PCT/CN2005/001230 dated Nov. 24, 2005, 3 pgs.

European Invitation pursuant to Article 94(3) and Rule 71(1) EPC for Application No. 05 772 878.4 dated Apr. 9, 2009, 3 pgs.

* cited by examiner

METHOD FOR REDUCING LOAD OF TRAFFIC PLANE FUNCTION

CROSS-REFERENCES TO RELATED APPLICATIONS

This is a continuation of International Application No. PCT/CN2005/001230, which was filed on Aug. 10, 2005, and which, in turn, claimed the benefit of Chinese Patent Application No. 200410070067.9, which was filed on Aug. 10, 2004, the entire disclosures of which are hereby incorporated herein by reference.

BACKGROUND OF THE INVENTION

1. Field of the Invention

The present invention relates to the charging techniques of packet radio service, and particularly, to a method for reducing the load of Traffic Plane Function (TPF).

2. Background of the Invention

Along with the increasing requirement to applications of General Packet Radio Service (GPRS), it has become a common concern of mobile communications operators about how to charge for the mobile packet data service reasonably and accurately.

The current traffic differentiation and traffic-type awareness of the GPRS network can only reach the level of Access Point Name (APN) and Packet Data Protocol (PDP) context, however, in practice, it is quite possible that several parallel service data flows (As to one packet data service, the data amount a user consumes when using the packet data service is referred to as service data flow, which consists of several packet data flows, i.e. IP data flows. One PDP context can bear several different services) may use the same PDP context as the bearer and different services may adopt different charging policies. In view of the above, 3GPP provides a new charging method for GPRS bearer, i.e., a method of service data Flow Based Charging (FBC). Obviously, the charging granularity of FBC is smaller than that of PDP context, which makes it possible to provide operators and service providers with more varied means of charging.

Figure 1:
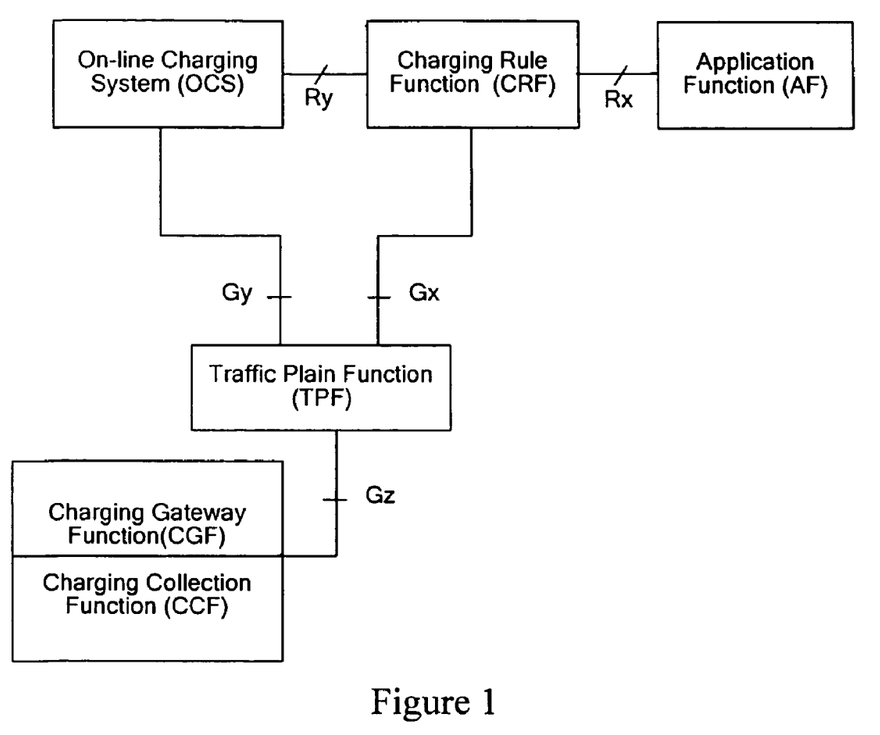
FIG. 1 is a schematic diagram illustrating the FBC system structure supporting online charging.
Figure 2:
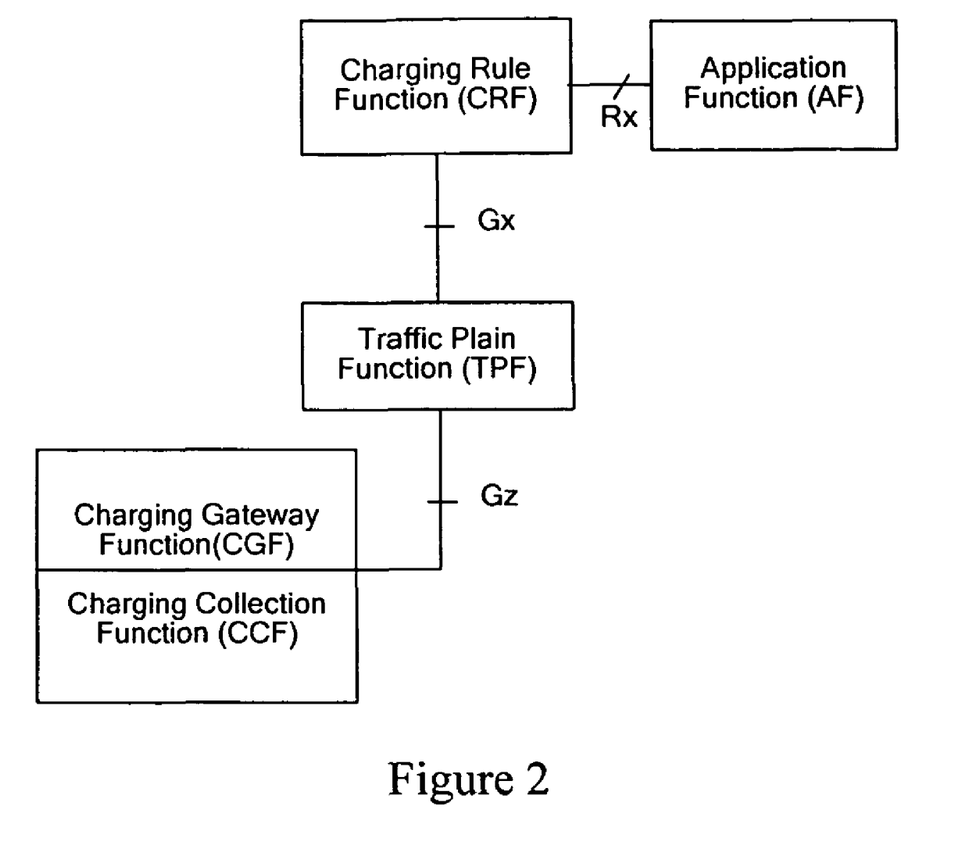
FIG. 2 is a schematic diagram illustrating the FBC system structure supporting offline charging.

A description of the FBC is hereinafter given according to the protocol of 3GPP TS23.125. The system structure of the FBC is shown as FIGS. 1 and 2, where FIG. 1 is a schematic diagram illustrating the system structure of the FBC supporting online charging, which mainly includes an Online Charging System (OCS), a Charging Rule Function (CRF), a Traffic Plane Function (TPF), an Application Function (AF), and a Charging Gateway Function/Charging Collection Function (CGF/CCF). And FIG. 2 is a schematic diagram illustrating the system structure of the FBC supporting offline charging, which mainly includes the CRF, the TPF, the AF and the CGF/CCF.

Each of the functions constituting the above FBC system is described, respectively, as follows:

1. TPF: The TPF is the entity to bear IP flows and is able to differentiate data packets belonging to different service data flows. When a bearer has some changes, for example, when creating, modifying, or deleting the bearer, the TPF will send a request to the CRF for charging rules via the interface Gx and the following information may be carried in the request: information related with user and terminal, e.g., Mobile Station ISDN (MSISDN), International Mobile Equipment Identity & Service Version (IMEISV); bearer characteristics, e.g., Quality of Service (QoS); and information correlative with the network, e.g., Mobile Network Code (MNC), Mobile Country Code (MCC). The TPF performs packet filtering and charging on the corresponding service data flow according to the charging rule returned by the CRF. The charging may include a series of charging correlative actions, such as collecting and generating charging information, and submitting the generated charging information.

One TPF may be served by one or more CRFs. Specifically, TPF may select a CRF to provide service according to the identity information of User Equipment (UE). Moreover, the TPF supports pre-defined charging rules and pre-defined filters.

2. CRF: The CRF is the entity to store charging rules, supporting both dynamic and static charging rules. The so-called dynamic charging rule means the charging rule is generated in real-time according to the service principles; and the static charging rule means that the charging rule remains unchanged while the user is using the data service, and the static charging rule can be dynamically activated. The CRF may select appropriate charging rules according to the input information received from the TPF, the AF, and the OCS, and send the selected charging rules to the TPF when it receives a request from the TPF or a pre-defined event is triggered.

One CRF may communicate with multiple TPFs, i.e. provides service for multiple TPFs.

3. AF: The AF represents all the entities associated with application, and may belong to the operator itself or a third-party service provider. The AF provides the CRF with appropriate application or service information which makes the CRF can select or configure the corresponding charging rules. The information provided by AF includes: identity information of service data flow, which may be a wildcard of identity information; information for charging rule selection; application/service identifier; application event identifier; type of stream, e.g. video, audio; and data rate of stream, where the type of stream and the data rate of stream are optional.

One AF may communicate with several CRFs. AF may select to interact with a CRF according to the identity information of the UE.

4. OCS: The OCS is for online charging function, containing Credit Control (CC) which is for use of executing credit control. The CC is usually employed within an online charging system only. The OCS provides the CRF via the interface Ry with the input information for selecting charging rules.

5. CCF/CGF: The CCF/CGF is for use of further processing the charging data submitted by the TPF so as to generate bills.

The foregoing system structure of the FBC is applicable to various radio access techniques, such as 3GPP, 3GPP2, WLAN, etc. Take 3GPP as an example, if the bearer network is GPRS, the TPF is a logical function allocated to the GGSN, and AF is an Application Gateway or Application Server in Packet Data Network (PDN). When an IP Multimedia Subsystem (IMS) uses the GPRS network as its bearer network, AF will be a Proxy Call Session Control Function (P-CSCF), and in this case, the CRF is a newly added logical entity.

Based on the foregoing system structure of the FBC, operations performed by the TPF will be described by taking the implementing procedures of offline charging and online charging as examples.

Figure 3:
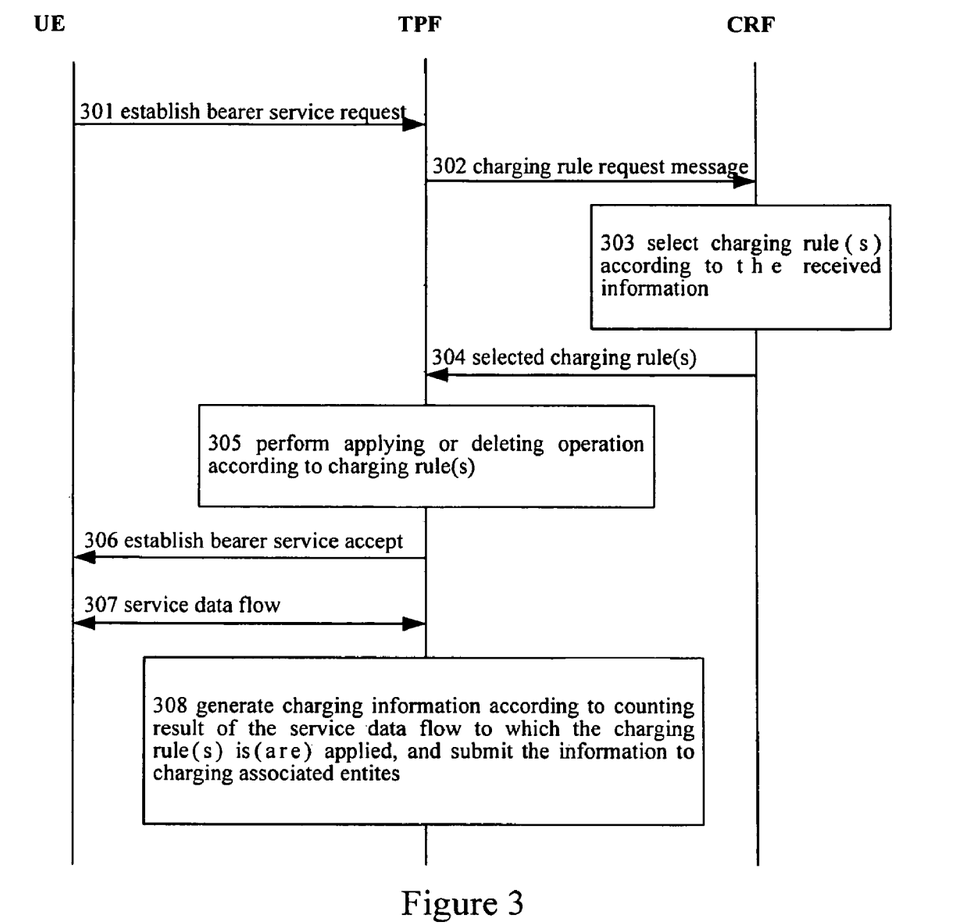
FIG. 3 is the flowchart of the offline charging based on the FBC system in the prior art.

FIG. 3 shows the flowchart of offline charging, which includes the steps of:

Step 301-step 302: The UE sends an establishing bearer service request message to the TPF, and the TPF sends a charging rule request message to the CRF after receiving the message.

Step 303-step 304: The CRF determines charging rules based on the information provided in the charging rule request received from the TPF. If there is also input information from the AF and/or the OCS for determining the charging rules, the CRF will select charging rules by the input information from the TPF and the input information from the AF and/or the OCS for use of determining the charging rule. Then the CRF provides the selected charging rules to the TPF. A charging rule may include: charging mode indication of service data flow, e.g. indication of online charging or offline charging, the recording mode of offline charging, e.g. volume based, or time based or both, charging key, filter(s) of service data flow, priority, and identifier of the charging rule.

The filter is for use of differentiating data packets which belong to a specific service data flow. The basic structure of a filter is an IP 5 tuple, including source IP address, destination IP address, source port number, destination port number and protocol ID of the protocol above IP. The charging key is for use of determining the charging rate. The priority is for use of determining which charging rule is to be used when there exist overlapping charging rules. The identifier of charging rule is for use of identifying a specific charging rule. The CRF just needs to provide the identifier corresponding to a charging rule instead of a complete charging rule to the TPF every time if the TPF has already configured the corresponding charging rule.

Step 305-step 306: The TPF performs appropriate actions as indicated by the received charging rule, e.g. applying or deleting the charging rule, and then responses to the UE with establishing bearer service accept message.

Step 307-step 308: The UE carries out service data transmission after receiving the establishing bearer service accept message, and the TPF performs counting and statistic operation for the service data flow on which the charging rule is applied, i.e. after filtering, performs charging operation which contains collecting and generating charging information, and submits the generated charging information in a certain format, for example, filling in a Call Detail Record (CDR), to the charging-associated entities to generate the final bill of the user.

Figure 4:
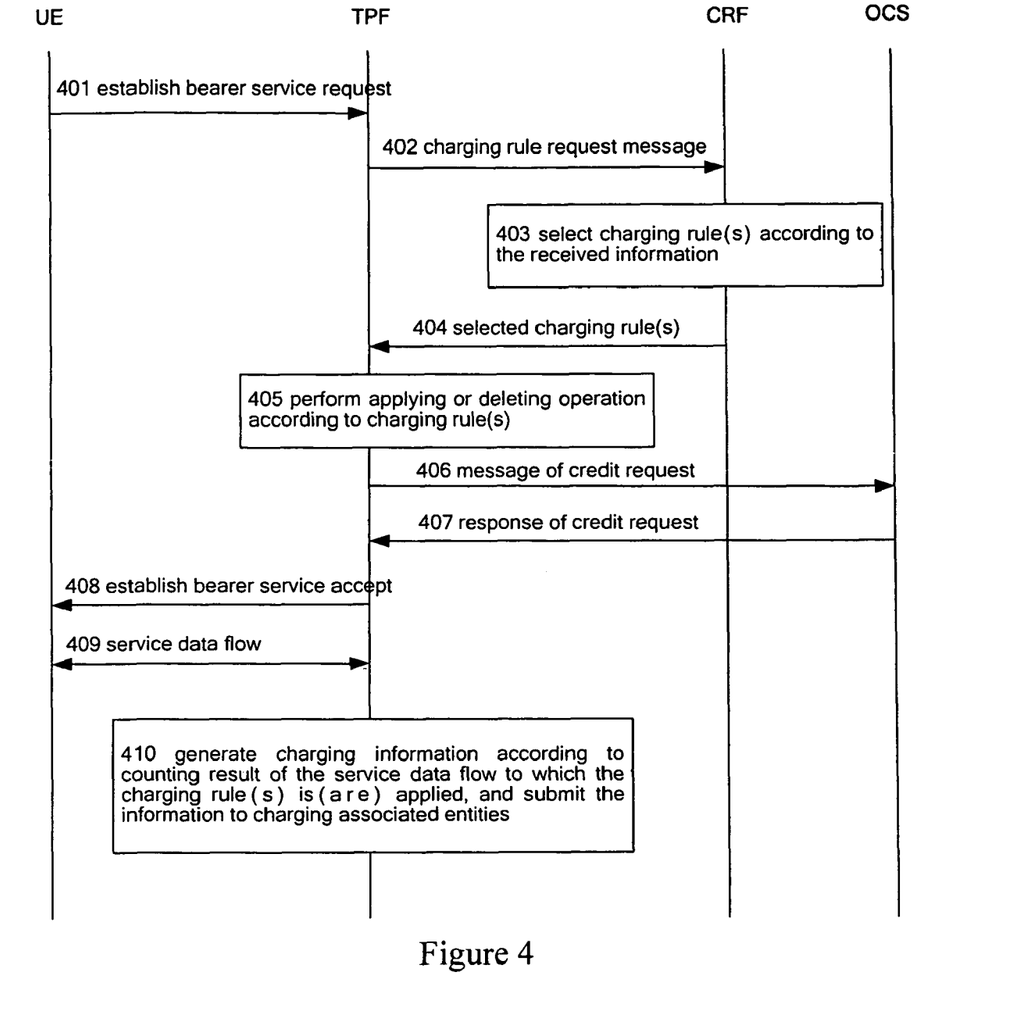
FIG. 4 is the flowchart of the online charging based on the FBC system in the prior art.

FIG. 4 shows the flowchart of online charging, which includes the steps of:

Step 401-step 402: The UE sends an establishing bearer service request message to the TPF, and the TPF sends a charging rule request message to the CRF after receiving the establish bearer service request.

Step 403-step 404: The CRF determines charging rules based on the information provided in the charging rule request received from the TPF. If there is also input information from the AF and/or the OCS for determining the charging rules, the CRF will select charging rules by combining the input information from the TPF and the input information from the AF and/or the OCS for determining the charging rule. Then the CRF provides the selected charging rules to the TPF. A charging rule may include: charging mode indication of service data flow, e.g. indication of online charging or offline charging, the recording mode of offline charging, e.g. volume based, or time based or both, charging key, filter(s) of service data flow, priority, and identifier of charging rule.

Step 405: The TPF performs appropriate actions as indicated by the received charging rule, e.g., applying or deleting the charging rule.

Step 406-step 408: The TPF sends a credit request message to the OCS, the OCS provides the TPF with the credit information related to the UE, and then the TPF responses to the UE with an establishing bearer service accept message.

Step 409-step 410: UE starts to transmit service data after receiving the establishing bearer service accept message. The TPF performs counting and statistical operation for the service data flow on which the charging rule is applied, i.e., after filtering, performs charging operation which contains collecting and generating charging information, and submits the generated charging information in a certain format, for example, filling in the CDR, to the charging-associated entities to generate the final bill of the user.

It can be seen from step 307-step 308 of the above offline charging procedure and step 409-step 410 of the online charging procedure that the TPF, after filtering the received service data flow, will generate the charging information and then submit the charging information to the charging-associated entities in a certain format to generate the final bill. The charging-associated entities may include a Charging Gateway (CG) and a Billing System (BS). The CG will combine the received charging information before sending them to the BS, which will generate the final bill.

In practice, however, not all the information collected and submitted by the TPF is useful for generating final bills of users.

SUMMARY OF THE INVENTION

The present invention provides a method for reducing the load of the Traffic Plane Function (TPF), applicable to a Flow Based Charging (FBC) system.

According to the charging rule information received from the Charging Rule Function (CRF), the TPF obtains the indication on whether to perform charging or not, and determines the content of the indication, if it is indicated to perform charging, the TPF filters the service data flow, and then collects and generates charging information, after that, the TPF submits the generated charging information; if it is indicated not to perform charging, the operation is ended up with filtering the service data flow.

The present invention also provides a method for reducing the load of the TPF, applicable to a FBC system, including the TPF determining whether to generate charging information for a service data flow, to which one or more charging rules are applied, according to an indication on whether to perform charging from a Charging Rule Function (CRF), if the TPF determines not to generate the charging information, the TPF do not generate the charging information upon the statistical result of the service data flow.

To sum up, in accordance with the method of this invention, the TPF determines whether to perform charging for the service data flow on which the appropriate charging rule(s) is used according to the received indication on whether to perform charging, if yes, collects and generates charging information after filtering the service data flow, and then submits the information to the charging-associated entities; otherwise only filters the service data flow without performing charging. In this way, operation in the TPF may be optimized such that the TPF just perform necessary charging instead of charging for the service data flow which does not need to be charged. As a result, the load of the TPF may be reduced, so is the load of network devices, and the system efficiency may be improved. Meanwhile, it is possible to avoid the waste of network resources aroused by various charging policies, e.g., free of charge policy, adopted by the operator.

DETAILED DESCRIPTION OF PREFERRED EMBODIMENTS

A further detailed description of this invention is hereinafter given with reference to the accompanying drawings.

The TPF in the embodiments of the invention determines whether to perform charging for the service data flow on which the appropriate charging rule(s) is(are) applied according to the obtained indication on whether to perform charging, i.e. whether to collect and generate charging information, and submit the generated charging information. In other words, if the indication on whether to perform charging obtained by the TPF indicates that charging is to be performed, it means that the TPF, after filtering the service data flow to which the charging rule is applied, needs to collect charging-related information, generates charging information, and then submits the generated charging information; if the indication on whether to perform charging obtained by the TPF indicates not to perform charging, it means that the TPF needs not perform the operation of collecting or generating charging information or submitting the information after filtering the service data flow to which the charging rule is applied.

Next, this invention is further described with reference to specific embodiments.

Figure 5:
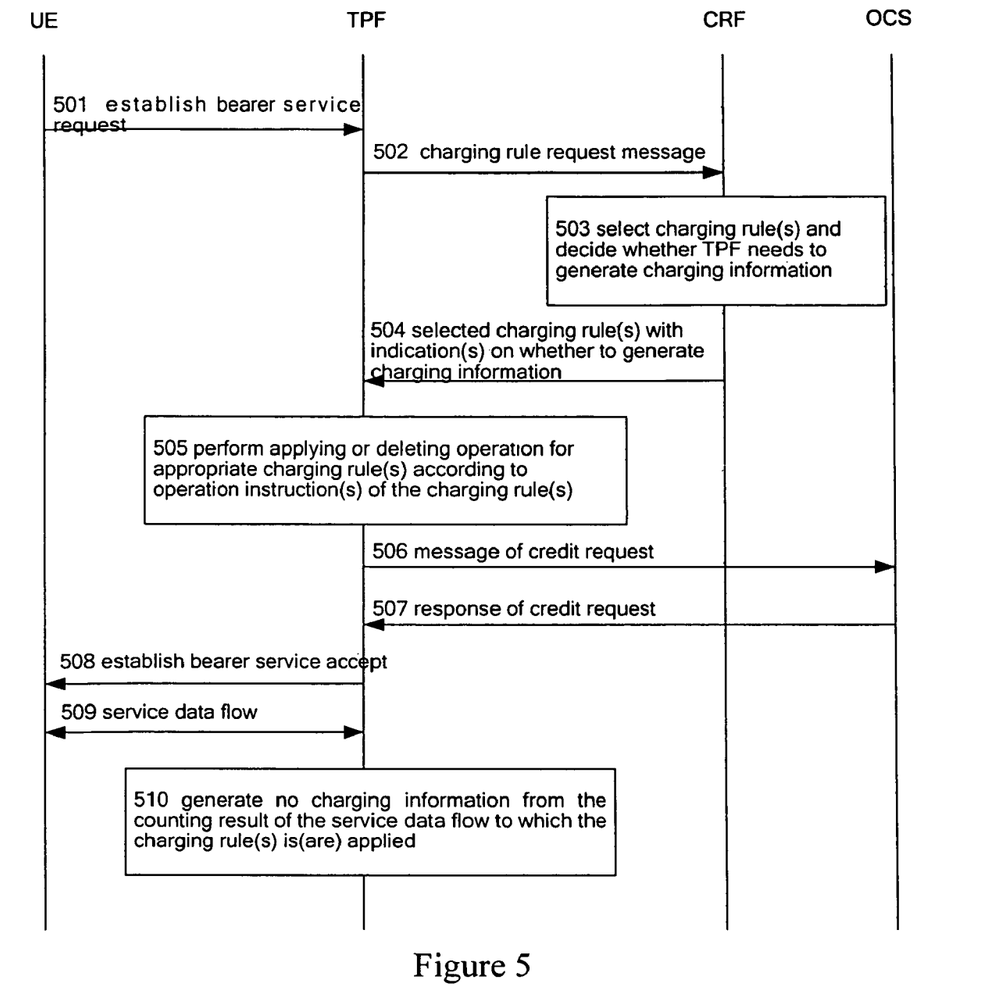
FIG. 5 is the flowchart of online FBC in accordance with the embodiment of this invention.

In this embodiment, the CRF determines, according to the information associated with network in the charging rule request message from the TPF, such as MCC and MNC, that itself and the TPF belong to the same operating network and this user is a pre-paid user whose charging mode of all services is online charging. Therefore, the CRF determines to control the TPF not to charge this user. In this embodiment, the indication on whether to perform charging is provided to the TPF by being carried in the selected charging rule. All charging information is collected by an Online Charging System (OCS). The flowchart of this embodiment is shown as FIG. 5, which specifically includes the steps of:

Step 501-step 502: The UE sends an establish bearer service request message to the TPF, and the TPF sends a charging rule request message to the CRF after receiving the establish bearer service request.

Step 503-step 504: The CRF determines the charging rule according to the charging rule request received from the TPF. Obviously, if there is input information from an Application Function (AF) and/or the OCS for determining the charging rule, the CRF will select charging rule by combining the input information from the TPF with the input information from the AF and/or the OCS for determining the charging rule. The CRF then sets the value of indication on whether to perform charging as not performing charging, and sends the selected charging rule with the indication to the TPF. In this embodiment, the charging rule information sent by the CRF is a specific charging rule, and the indication on whether to perform charging is a field in the charging rule.

Step 505: The TPF performs appropriate actions as indicated by the charging rule, e.g. applying or deleting the charging rule.

Step 506-step 508: The TPF sends a credit request message to the OCS, the OCS provides the TPF with the related credit information, and then the TPF responses to the UE with an establish bearer service accept message.

Step 509-step 510: UE starts to transmit service data after receiving the establish bearer service accept message. In this embodiment, as the value of the indication field on whether to perform charging in the charging rule is performing no charging, after obtaining directly from the charging rule the indication of performing no charging, the TPF only performs counting and statistical operation of the service data flow to which this charging rule is applied, i.e., only performs filtering, no more operation of collecting, generating, or submitting charging information.

If the charging rule information sent by the CRF is more than one charging rule, and the indication on whether to perform charging is a field in each of these charging rules, the process above can also be applied.

If the TPF has configured one or more than one charging rule and has set the indication on whether to perform charging operation of the service data flows to which this or these charging rules are applied, then in the above step 503-step 504, the CRF may send only the charging rule identifier(s) corresponding to the selected charging rule(s) to the TPF. According to the received charging rule identifier(s), the TPF obtains the locally configured charging rule(s) and performs appropriate actions as indicated by the charging rule(s), meanwhile the TPF obtains the indication(s) on whether to perform charging according to the indication information on whether to perform charging corresponding to the charging rule(s), thereby determines whether to collect, generate, and submit to the charging associated functions the charging information.

Hereinafter, another implementing mode of this invention is described by an embodiment. There are cases in which one or more than one charging rule may be applied to a kind of service or to one connection of a user, while it is allowed that no charging operation is performed to the service data flows belonging to this kind of service or this kind of user. Then an indication on whether to perform charging may be applied to one or several charging rules, and such an indication can be associated with one or several charging rules and is sent to the TPF together with this or these charging rule(s).

Figure 6:
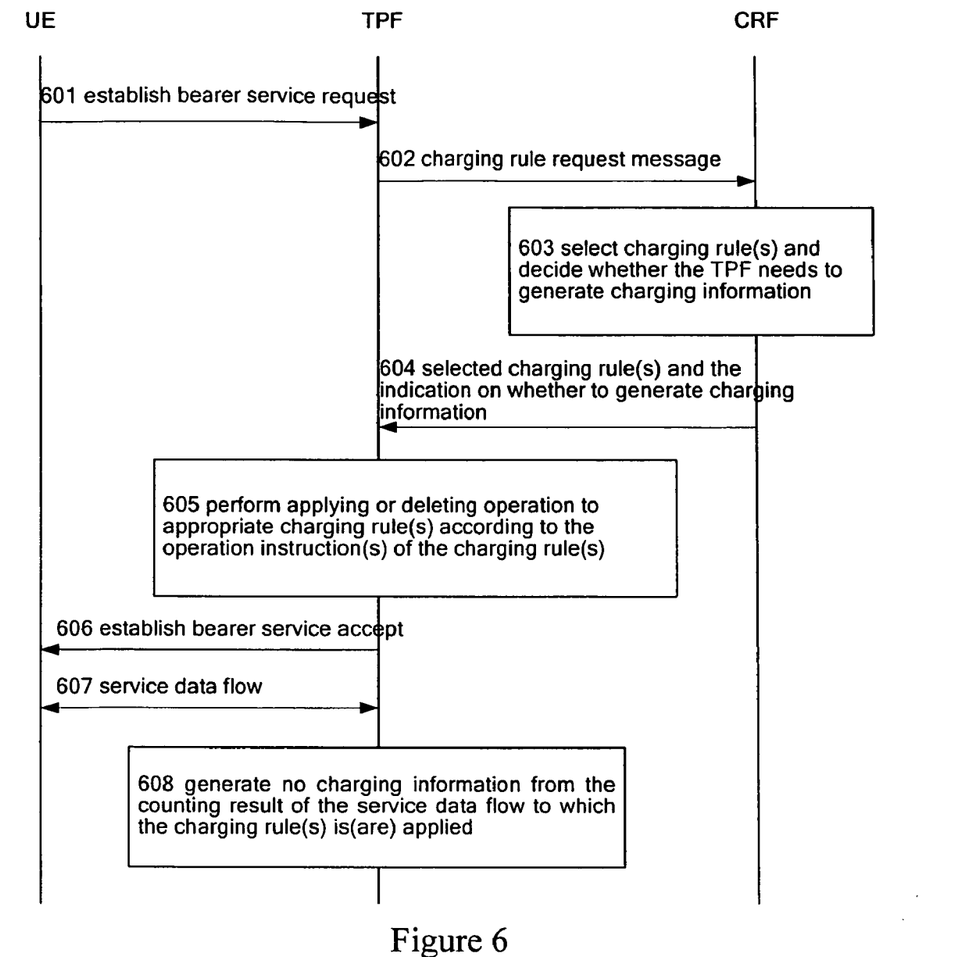
FIG. 6 is the flowchart of offline FBC in accordance with the embodiment of this invention.

In this embodiment, the charging mode of the user's service is fixed monthly charging. Then no matter whether this user uses the service in a month, how long it uses, and how much the service data volume is, the operator will charge this user with a fixed fee. In this case, the charging system may choose not to charge for the services this user uses, and all the fees incurred by this user in using the bearer may be collected by other ways. The flowchart of this embodiment is shown in FIG. 6, which specifically includes the steps of:

Step 601-step 602: UE sends an establish bearer service request message to the TPF, and after receiving the establish bearer service request, the TPF sends a charging rule request message to the CRF.

Step 603-step 604: The CRF selects one or several charging rules according to the charging rule request received from the TPF. If there is also input information from the AF and/or the OCS for determining the charging rule(s), the CRF will select charging rule(s) by combining the input information from the TPF with the input information from the AF and/or the OCS for determining the charging rule(s) to be provided. Then the CRF sets the value of indication on whether to perform charging as not performing charging, and then associates the indication on whether to perform charging with one or more charging rules selected and sends the indication to the TPF together with the charging rule(s). In this embodiment, the indication on whether to perform charging indicates to perform no charging. In other words, the charging rule information the CRF sends includes one or more charging rules as well as the indication information of not performing charging associated with the one or more charging rules.

Step 605-step 606: The TPF performs actions as indicated by the received charging rule(s), e.g. applying or deleting the charging rule(s), and responds the UE with a establish bearer service accept message.

Step 607-step 608: UE starts to transmit service data after receiving the establish bearer service accept message. In this embodiment, as the indication on whether to perform charging indicates to perform no charging, the TPF, after obtaining directly from the charging rule information this indication of performing no charging, only performs counting and statistical operation for the service data flow to which this charging rule is applied, i.e. only performs filtering, no more operation of collecting, generating, or submitting charging information.

If the TPF has configured one or more than one charging rule and has set the indication on whether to perform charging operation for the service data flows to which this or these charging rules are applied, then in the above step 603-step 604, the CRF may send to the TPF only the charging rule identifier(s) corresponding to the charging rule(s). According to the received charging rule identifier(s), the TPF obtains the locally configured charging rule(s) and performs appropriate actions as indicated by the charging rule(s), meanwhile the TPF obtains the indication on whether to perform charging according to the indication information on whether to perform charging corresponding to the charging rule(s), thereby determines whether to collect, generate, and submit to the charging associated entities the charging information.

In the implementing procedures as shown in FIG. 5 and FIG. 6, if the TPF has configured one or more than one charging rule but has not set the indication(s) on whether to perform charging for the service data flows to which this or these charging rules are applied, then the CRF may send to the TPF both the charging rule identifier(s) corresponding to this or these charging rules and the indication(s) on whether to perform charging for the service data flows to which this or these charging rules are applied at the same time. In other words, in this case, the charging rule information sent by the CRF includes the charging rule identifier(s) and the field(s) of indication on whether to perform charging, the TPF finds the corresponding charging rule(s) according to the charging rule identifier(s) and performs appropriate actions as indicated by the charging rule(s), e.g. applying or deleting the charging rule(s), and meanwhile the TPF obtains the indication on whether to perform charging from the designated field(s) of the charging rule information, thereby determines whether to collect, generate, and submit the charging information to the charging associated entities.

It can be seen that, in the prior art, the information sent by the CRF only indicates whether the TPF is to perform online charging or offline charging but not indicate whether the TPF is to perform charging or not. While in accordance with this invention, the indication added will also indicate whether the TPF is to perform charging or no charging. Obviously, if it is to perform no charging, the TPF will only perform the filtering operation, i.e. perform neither online charging nor offline charging.

The foregoing description is only the embodiments of making the TPF to perform no charging, i.e. not collect, generate, or submit charging information. In practical applications, it can be decided according to the operator's policy when to perform charging and when to perform no charging so as to reduce the load of the TPF more effectively and avoid waste of network resources.

To sum up, the foregoing description is only the preferred embodiments of this invention and is not to be construed as limiting the protection scope of this invention.

The invention claimed is:

1. A method for reducing load of a Traffic Plane Function (TPF), applicable to a Flow Based Charging (FBC) system, comprising:
    obtaining, by the Traffic Plane Function, an indication on whether to perform charging according to charging rule information received from a Charging Rule Function (CRF); and
    if the indication indicates to perform charging, collecting, by the Traffic Plane Function, charging-related information, and generating and submitting, by the Traffic Plane Function, charging information;
    if the indication indicates to perform no charging, filtering, by the Traffic Plane Function, service data flow, and not generating, by the Traffic Plane Function, charging information.

2. The method according to claim 1, wherein the charging rule information the TPF receives from the CRF contains one or more charging rules, and this or each of these charging rules comprises an indication field on whether to perform charging; and
    the TPF obtaining the indication on whether to perform charging comprises: obtaining, by the TPF, the indication on whether to perform charging directly from the indication field in the received charging rule(s).

3. The method according to claim 1, wherein the charging rule information the TPF receives from the CRF contains one or more charging rules and the indication information on whether to perform charging associated with the charging rule(s); and
    the TPF obtaining the indication on whether to perform charging comprises: obtaining, by the TPF, the indication information on whether to perform charging from the received charging rule information, and obtaining the indication on whether to perform charging from the indication information.

4. The method according to claim 1, wherein the TPF pre-stores one or more charging rules, the charging rule information the TPF receives from the CRF contains identifier(s) of the charging rule(s) and an indication field on whether to perform charging; and
    the TPF obtaining the indication on whether to perform charging comprises: obtaining, by the TPF, the indication on whether to perform charging from the indication field of the received charging rule information.

5. The method according to claim 1, wherein the TPF pre-stores one or more charging rules, and this or each of these charging rules comprises an indication field on whether to perform charging, the charging rule information the TPF receives from the CRF contains identifier(s) of the charging rule(s); and
    the TPF obtaining the indication on whether to perform charging comprises: obtaining, by the TPF, the charging rule(s) pre-stored in the TPF according to the received identifier(s) of the charging rule(s), and obtaining the indication on whether to perform charging according to the indication information on whether to perform charging corresponding to the pre-stored charging rule(s).

6. The method according to claim 1, further comprising: before obtaining the indication on whether to perform charging according to the charging rule information received from the CRF, sending, by the TPF, a charging rule request to the CRF; and determining, by the CRF, the charging rule information according to the charging rule request received from the TPF.

7. The method according to claim 6, further comprising:
before determining the charging rule information according to the charging rule request received from the TPF,
receiving, by the CRF, input information for determining the charging rule from an Online Charging System (OCS) and/or an Application Function (AF), and determining the charging rule information by combining the input information from the TPF with the input information from the OCS and/or the AF.

8. A method for reducing load of a Traffic Plane Function (TPF), applicable to a Flow Based Charging (FBC) system, comprising:
determining, by the Traffic Plane Function, whether to generate charging information for a service data flow, to which one or more charging rules are applied, according to an indication on whether to perform charging from a Charging Rule Function (CRF);
if the Traffic Plane Function determines not to generate the charging information, filtering, by the Traffic Plane Function, the service data flow, and not generating, by the TPF, the charging information upon a statistical result of the service data flow.

9. The method according to claim 8, further comprising:
generating, by the TPF, the charging information according to the statistical result of the service data flow, and submitting the generated charging information to a relevant charging entity, if the TPF determines to generate the charging information.

10. The method according to claim 9, wherein the indication contains one or more charging rules with indication information on whether to perform charging, wherein the charging rule(s) is (are) selected by the CRF.

11. The method according to claim 9, wherein, the indication contains one or more charging rules selected by the CRF and indication information on whether to perform charging.

12. The method according to claim 9, wherein, the TPF has pre-stored one or more charging rules, the indication contains identifier(s) of the charging rule(s) selected by the CRF, and indication information on whether to perform charging corresponding to the selected charging rule(s).

13. The method according to claim 9, wherein, the TPF has pre-stored one or more charging rules and the indication information on whether to perform charging corresponding to the charging rule(s), the indication contains an identifier(s) of the charging rule(s) selected by the TPF.

14. A Flow Based Charging (FBC) system, comprising a Traffic Plane Function (TPF), wherein
the Traffic Plane Function is configured to obtain an indication on whether to perform a charging according to charging rule information received from a Charging Rule Function (CRF), and determine a content of the indication; if the indication indicates to perform the charging, the Traffic Plane Function collects charging-related information, generates and submits charging information; if the indication indicates to perform no charging, the Traffic Plane Function filters service data flow and does not generate the charging information.

15. The FBC system according to claim 14, wherein
the charging rule information the TPF receives from the CRF contains one or more charging rules, and this or each of these charging rules comprises an indication field on whether to perform charging;
the TPF is further configured to obtain the indication on whether to perform the charging from the indication field in the received charging rule(s).

16. The FBC system according to claim 14, wherein
the charging rule information the TPF receives from the CRF contains one or more charging rules and indication information on whether to perform charging associated with the charging rule(s);
the TPF is further configured to obtain the indication information on whether to perform charging from the received charging rule information, and obtain the indication on whether to perform charging from the indication information.

17. The FBC system according to claim 14, wherein
the charging rule information the TPF receives from the CRF contains identifier(s) of the charging rule(s) and an indication field on whether to perform charging;
the TPF is further configured to pre-store one or more charging rules and obtain the indication on whether to perform the charging from the indication field in the received charging rule information.

18. The FBC system according to claim 14, wherein
the charging rule information the TPF receives from the CRF contains identifier(s) of the charging rule(s);
the TPF is further configured to pre-store one or more charging rules, and this or each of these charging rules comprises an indication field on whether to perform charging; and
the TPF is further configured to obtain charging rule(s) pre-stored in the TPF according to the received identifier(s) of the charging rule(s), and obtain the indication on whether to perform charging according to the indication information on whether to perform charging corresponding to the pre-stored charging rule(s).

19. The FBC system according to claim 14, wherein
the TPF is further configured to send a charging rule request to the CRF;
the CRF is configured to determine the charging rule information according to the charging rule request received from the TPF.

20. The FBC system according to claim 19, wherein
the CRF is further configured to receive input information for determining the charging rule from an Online Charging System (OCS) and/or an Application Function (AF), and determine the charging rule information by combining the input information from the TPF with the input information from the OCS and/or the AF.

* * * * *